United States Patent [19]
Yamamoto

[11] Patent Number: 5,327,458
[45] Date of Patent: Jul. 5, 1994

[54] AUTOMATIC EQUALIZER CAPABLE OF EFFECTIVELY CANCELLING INTERSYMBOL INTERFERENCE AND CROSS POLARIZATION INTERFERENCE IN CO-CHANNEL DUAL POLARIZATION

[75] Inventor: Takeshi Yamamoto, Tokyo, Japan
[73] Assignee: NEC Corporation, Tokyo, Japan
[21] Appl. No.: 978,383
[22] Filed: Nov. 18, 1992
[30] Foreign Application Priority Data
   Nov. 18, 1991 [JP] Japan ................ 3-302169
[51] Int. Cl.[5] ............... H03H 7/30; H03H 7/40; H03K 5/159
[52] U.S. Cl. ................... 375/12; 375/14; 375/40; 375/100; 364/724.2
[58] Field of Search ............ 375/11, 12, 14, 17, 375/40, 100, 101, 102, 103; 364/724.19, 724.2; 455/132

[56] References Cited

U.S. PATENT DOCUMENTS

| | | | |
|---|---|---|---|
| 4,577,330 | 3/1986 | Kavehrad | 375/15 |
| 4,631,734 | 12/1986 | Foschini | 375/102 X |
| 4,644,562 | 2/1987 | Kavehrad et al. | 375/101 X |
| 4,910,468 | 3/1990 | Ohtsuka et al. | 375/102 X |

FOREIGN PATENT DOCUMENTS

| | | |
|---|---|---|
| 3218137 | 3/1991 | Japan . |
| 4181802 | 4/1992 | Japan . |
| WO8504996 | 11/1985 | World Int. Prop. O. . |

OTHER PUBLICATIONS

IEEE Journal On Selected Areas In Communication, vol. SAC-5, No. 3, Apr. 1987, pp. 484–492, M. Borgne, "A New Class of Adaptive Cross-Polarisation Interference Cancellers for Digital Radio Systems".
IEEE Global Telecommunications Conference Record, vol. 3, 1 Dec. 1986, pp. 1874–1878, M. Borgne, "Adaptive Receiver in Digital Radio Transmission Over Dually Polarized Fading Channels".
Hiroyuki Ohtsuka et al., "The SBS Control Algorithm of Cross Polarization Interference Canceller on Digital Radio Systems, The Transactions of the IEICE", vol. E73, No. 3, Mar. 1990, pp. 401–408.

Primary Examiner—Stephen Chin
Assistant Examiner—Bryan Webster
Attorney, Agent, or Firm—Sughrue, Mion, Zinn, Macpeak & Seas

[57] ABSTRACT

In an automatic equalizer (20) connected to a demodulator section (14) to equalize a demodulated signal into an equalized signal as an output signal, first and second received signals are transmitted in common through a co-channel to the demodulator section. The first and the second received signals have first and second polarizations, respectively. The first and the second received signals are demodulated into first and second demodulated signals which have first and second data signals, respectively. A first equalizer section (31) equalizes the first data signal into a first equalized signal. A transversal filter (18) filters the second data signal into a filtered signal. In order to cancel a cross polarization interference, the subtracter (19) subtracts the filtered signal from the first equalized signal to produce an intermediate signal. In order to cancel an intersymbol interference, a second equalizer section (32) equalizes the intermediate signal into a second equalized signal which is outputted as the output signal.

5 Claims, 5 Drawing Sheets

AUTOMATIC EQUALIZER CAPABLE OF EFFECTIVELY CANCELLING INTERSYMBOL INTERFERENCE AND CROSS POLARIZATION INTERFERENCE IN CO-CHANNEL DUAL POLARIZATION

BACKGROUND OF THE INVENTION

This invention relates to an automatic equalizer for use in equalizing a demodulated signal sent from a demodulator.

In general, a receiver section comprises a demodulator which is operable in response to a received signal to demodulate the received signal into a demodulated signal which may be a baseband signal having a binary level or a multilevel. The received signal may be subjected to an influence of fading while transmitted to the receiver section through a radio channel. The received signal has one of first and second polarizations each of which is for use in carrying a data signal. Specifically, the first polarization may be one of vertical and horizontal polarizations while the second polarization may be another one of the vertical and the horizontal polarizations. Hereinafter, the received signal of the first polarization will be called a first received signal while the received signal of the second polarization will be called a second received signal. The first and the second received signals may be transmitted to the receiver section through a co-channel which is used in common as the radio channel.

On reception of the first and the second received signals, the demodulator in the receiver section demodulates the first and the second received signal into first and second demodulated signals which carry first and second data signals, respectively.

Inasmuch as the first and the second received signals are transmitted to the receiver section through the co-channel as mentioned above, a cross polarization interference often occurs between the first received signal and the second received signal during its transmission in addition to an intersymbol interference. Taking this into account, an automatic equalizer is included in the receiver section so as to cancel the cross polarization interference.

A conventional automatic equalizer of the type described comprises a decision-feedback equalizer section, a transversal filter, and a subtracter. In case where the first demodulated signal is equalized into an equalized signal which may be produced as an output signal, the first demodulated signal is at first supplied to the decision-feedback equalizer section in order to cancel the intersymbol interference in the first demodulated signal. The decision-feedback equalizer section equalizes the first demodulated signal into a provisional equalized signal which is substantially free from the intersymbol interference. While the second demodulated signal is supplied to the transversal filter to be filtered into a filtered signal.

The provisional equalized signal and the filtered signal are further supplied to the subtracter in order to cancel the cross polarization interference. The subtracter subtracts the filtered signal from the provisional equalized signal to produce the output signal.

Such an automatic equalizer is disclosed in an article contributed by Hiroyuki Ohtsuka et al to the Transactions of the IEICE, Vol. E73, No. 3, March 1990, pages 401 to 408, under the title of "The SBS Control Algorithm of Cross Polarization Interference Canceller on Digital Radio System".

By the way, the provisional equalized signal includes a component which is caused by the cross polarization interference. As well known in the art, the provisional equalized signal appears in the decision-feedback equalizer on equalizing the first demodulated signal into the provisional equalized signal. Therefore, the intersymbol interference inevitably remains as a remaining intersymbol interference in the provisional equalized signal by the component which is caused by the cross polarization. As a result, the output signal includes a component which is caused to occur by the remaining intersymbol interference. Namely, it is difficult for the conventional automatic equalizer to effectively cancel the intersymbol interference in the output signal.

SUMMARY OF THE INVENTION

It is therefore an object of this invention to provide an automatic equalizer capable of effectively cancelling an intersymbol interference and a cross polarization interference.

Other objects of this invention will become clear as the description proceeds.

On describing the gist of this invention, it is possible to understand that an automatic equalizer is for use in a receiver section comprising a demodulator which demodulates first and second received signals into first and second demodulated signals, respectively. The automatic equalizer is for equalizing the first demodulated signal into an equalized signal to produce the equalized signal as an output signal. The first and the second received signals are transmitted through a co-channel to the receiver section. The first received signal has a first polarization which carries a first data signal. The second received signal has a second polarization which carries a second data signal. The first and the second demodulated signals have the first and the second data signals, respectively.

According to this invention, the above-understood automatic equalizer comprises (A) first equalizer means for equalizing the first data signal into a first equalized signal, (B) filter means for filtering the second data signal into a filtered signal, (C) producing means for producing an intermediate signal dependent upon the first equalized signal and the filtered signal, (D) second equalizer means for equalizing the intermediate signal into a second equalized signal to produce a second equalized signal.

DESCRIPTION OF THE PREFERRED EMBODIMENTS

Figure 1:
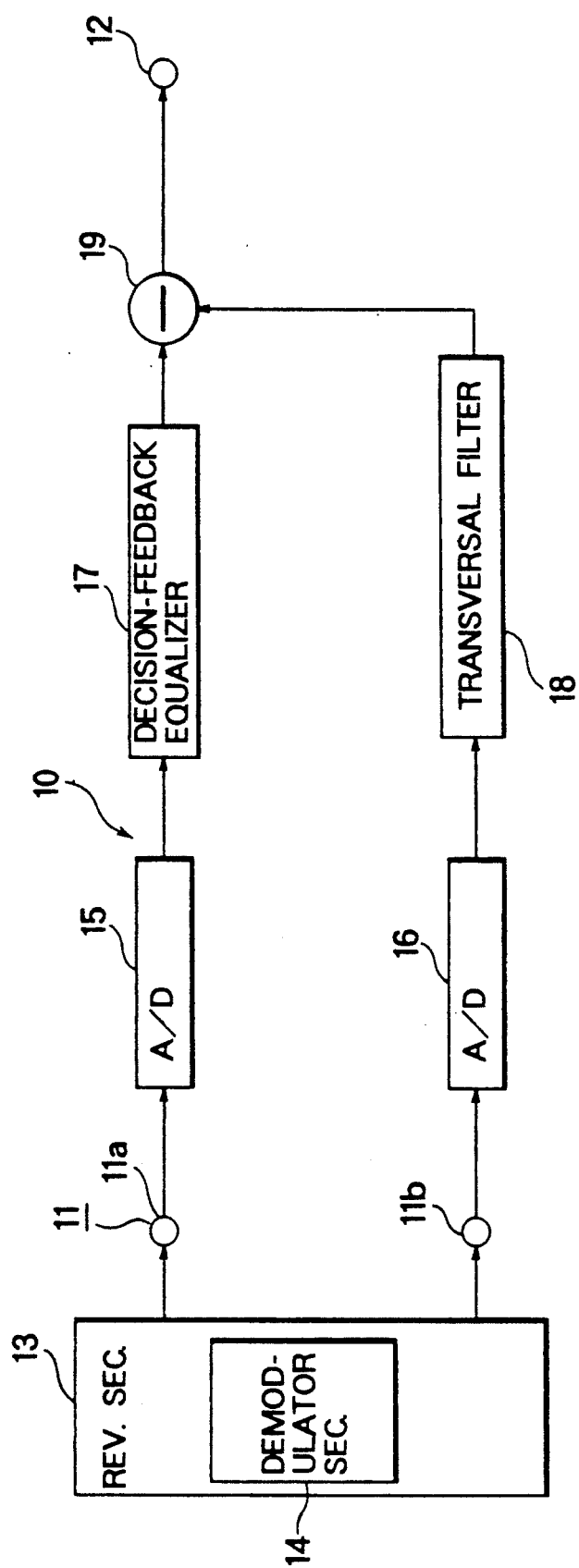
FIG. 1 is a block diagram of a conventional automatic equalizer.

Referring to FIG. 1, description will first be made as regards a conventional automatic equalizer 10 for a better understanding of this invention. The automatic equalizer has an equalizer input and output terminal 11 having first and second terminals 11a and 11b. The automatic equalizer further has an equalizer output terminal 12. The equalizer input terminal 11 is connected to a receiver section 13 which comprises a demodulator section 14. Through a radio channel, a transmitted signal is supplied to the receiver section 13 as a received signal which is subjected to fading while transmitted to the receiver section 13 through the radio channel.

The received signal has one of first and second polarizations each of which is for use in carrying a data signal. The first polarization may be one of vertical and horizontal polarizations. The second polarization may be another one of vertical and horizontal polarizations. The received signal of the first polarization will be called a first received signal. The received signal of the second polarization will be called a second received signal. In the illustrated example, the first and the second received signals carry first and second data signals, respectively. Both of the first and the second received signals may be transmitted to the receiver section 13 through a co-channel which is used in common as the radio channel. When both of the first and the second received signals are transmitted through the co-channel to the receiver section 13, a cross polarization interference occurs between the first received signal and the second received signal by fading. Similarly, an intersymbol interference occurs to each of the first and the second received signals by fading.

In the receiver section 13, the demodulator section 14 demodulates the first and the second received signals into first and second demodulated signals, respectively. The first and the second demodulated signals are supplied to the first and the second input terminals 11a and 11b of the automatic equalizer 10, respectively. Each of the first and the second demodulated signals may be a baseband signal having a binary level or a multilevel. The first and the second demodulated signals have the first and the second data signals, respectively. The first data signal is converted into a first digital data signal by a first analog-digital (A/D) converter 15 at a sampling frequency f. Similarly, the second data signal is converted into a second digital data signal by a second A/D converter 16 at the sampling frequency f. The remaining parts of the illustrated automatic equalizer 10 serve to equalize the first digital data signal into an equalized signal as an output signal for supplying the output terminal 12 with the output signal.

The automatic equalizer 10 comprises a decision-feedback equalizer 17, a transversal filter 18, and a subtracter 19. In the illustrated example, a combination of the transversal filter 18 and the subtracter 19 constructs a cross polarization interference canceller. In order to cancel the intersymbol interference in the first digital data signal, the first digital data signal is supplied from the first A/D converter 15 to the decision-feedback equalizer 17 to be equalized into a first equalized signal in a known manner in the art. Otherwise, the second digital data signal is supplied from the A/D converter 16 to the transversal filter 18 to be filtered into a filtered signal in a known manner in the art.

In order to cancel a cross polarization interference in the first equalized signal, the first equalized signal is supplied from the decision-feedback equalizer 17 to the subtracter 19. The filtered signal is also supplied from the transversal filter 18 to the subtracter 19. The subtracter 19 subtracts the filtered signal from the first equalized signal to produce the output signal which is free from the cross polarization interference. The above-mentioned transversal filter 18 is disclosed in Japanese Unexamined Patent Publication No. 181802/1992 (Tokkai Hei 4-181802). The cross polarization interference is disclosed in Japanese Unexamined Patent Publication No. 218137/1991 (Tokkai Hei 3-218137).

By the way, the first equalized signal is also used for equalizing the first digital data signal into the first equalized signal in the decision-feedback equalizer. Inasmuch as the first equalized signal includes a component which is caused by the cross polarization interference, it is difficult for the decision-feedback equalizer to effectively cancel the intersymbol interference from the first equalized signal. Therefore, the output signal inevitably includes the component which is caused by the intersymbol interference.

Figure 2:
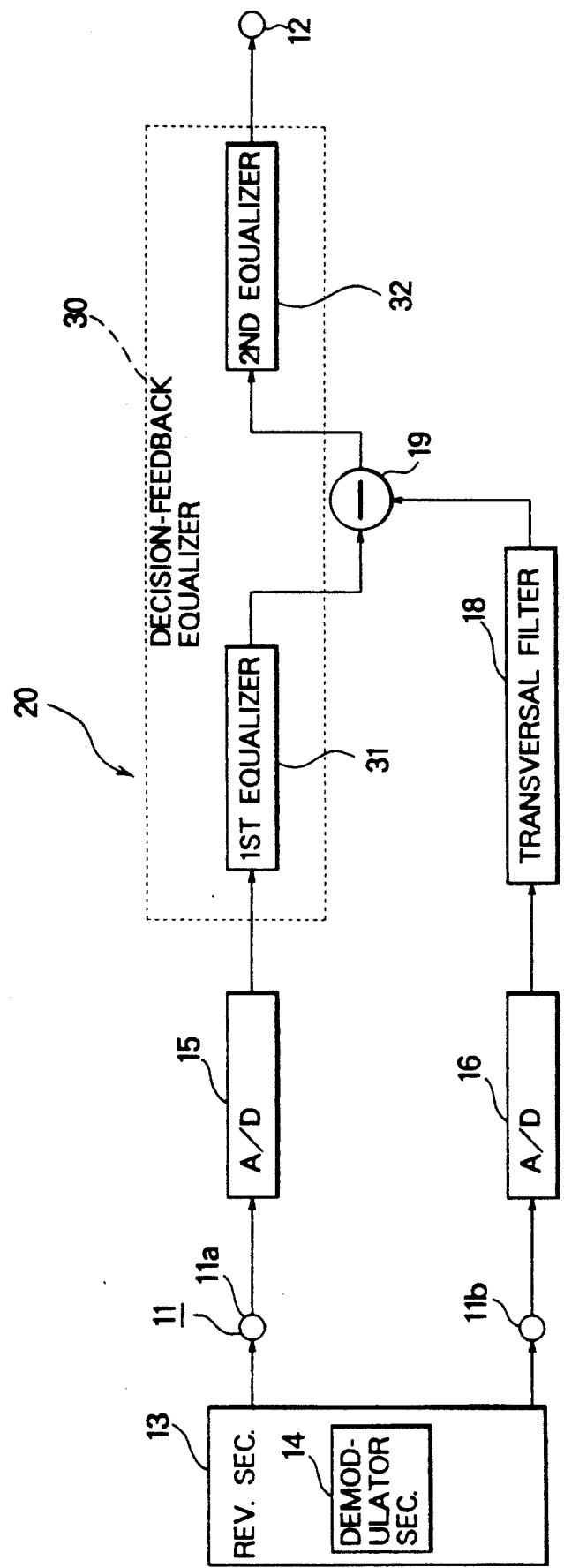
FIG. 2 is a block diagram of an automatic equalizer according to a first embodiment of this invention.

Referring to FIG. 2, description will proceed to an automatic equalizer according to a first embodiment of this invention. The illustrated automatic equalizer is different in structure from the automatic equalizer 10 illustrated with reference to FIG. 1 and is therefore designated afresh by a reference numeral 20. The automatic equalizer 20 comprises similar parts which are designated by like reference numerals and are operable with likewise named signals. The automatic equalizer 20 comprises a decision-feedback equalizer which is different from the decision-feedback equalizer 17 illustrated in FIG. 1 and which is therefore designated by a different reference numeral 30. The decision-feedback equalizer 30 comprises first and second equalizer sections 31 and 32.

As described in connection with FIG. 1, the first digital data signal is supplied from the A/D converter 15 to the decision-feedback equalizer 30. The second digital data signal is supplied from the A/D converter 16 to the transversal filter 18. The transversal filter 18 delivers the filtered signal to the subtracter 19.

Figure 3:
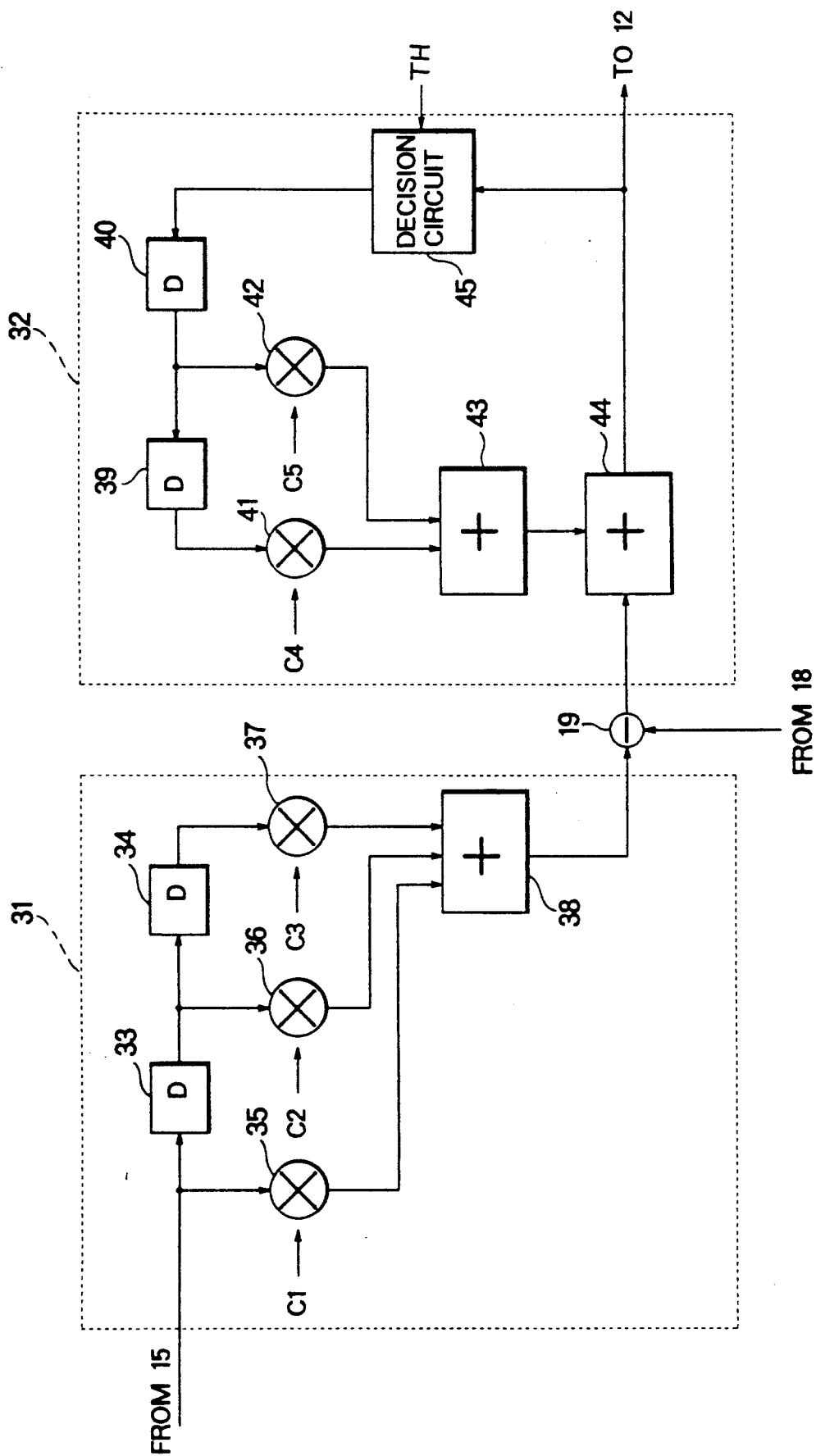
FIG. 3 is a block diagram of first and second equalizer sections illustrated in FIG. 2.

Referring to FIG. 3, the first equalizer section 31 comprises first and second delay circuits (D) 33 and 34, first through third multipliers 35 to 37, and a first adder 38. Each of the first and the second delay circuits 33 and 34 gives a delay of a predetermined time (1/f) to a signal supplied thereto. The first digital data signal is supplied to the first multiplier 35. The first and the second delay circuits 33 and 34 supply first and second delayed signals to the second and the third multipliers 36 and 37, respectively.

Supplied with a first tap gain C1 in the manner well known in the art, the first multiplier 35 multiplies the first digital data signal by the first tap gain C1 to supply a first multiplied signal to the first adder 38. Similarly, the second and the third multipliers 36 and 37 multiply the first and the second delayed signals by second and third tap gains C2 and C3, respectively. The second and the third multipliers 36 and 37 deliver second and third multiplied signals to the first adder 38. The first adder 38 calculates a total sum of the first through the third multiplied signals to supply the total sum as a first equalized signal to the subtracter 19. The subtracter 19 subtracts the filtered signal from the first equalized signal to supply a difference signal as an intermediate signal to the second equalizer section 32.

The second equalizer section 32 comprises third and fourth delay circuits 39 and 40, fourth and fifth multipliers 41 and 42, second and third adders 43 and 44, and a decision circuit 45. Supplied with an adder input signal as described hereinafter, the third adder 44 calculates a sum of the intermediate signal and the adder input signal to produce the sum as a second equalized signal. The second equalized signal is supplied as the output signal to the output terminal 12. The second equalized signal is also supplied to a decision circuit 45. The decision circuit 45 is given a predetermined threshold level TH from a threshold circuit (not shown). The decision circuit 45 at first judges the second equalized signal whether or not a binary level of the second equalized signal exceeds the predetermined threshold level to decide a judged binary level for the second equalized signal. The decision circuit 45 thereby produces a judged signal specifying the judged binary signal.

Each of the third and the fourth delay circuits 39 and 40 gives a delay of the predetermined time (1/f) to a signal supplied thereto. The third and the fourth delay circuits 39 and 40 supply third and fourth delay signals to the fourth and the fifth multipliers 41 and 42. Supplied with fourth and fifth tap gains C4 and C5 in the manner well known in the art, the fourth and the fifth multipliers 41 and 42 multiply the third and the fourth delayed signals by the fourth and the fifth tap gains C4 and C5, respectively. The fourth and the fifth multipliers 41 and 42 delivers fourth and fifth multiplied signals to the second adder 43. The second adder 43 calculates a sum of the fourth and the fifth multiplied signals to supply the sum as the adder input signal to the third adder 44.

As described above, the intermediate signal is equalized into the second equalized signal by the second equalizer section 32 after the cross polarization interference is cancelled by the subtracter 19. Therefore, it is possible to effectively cancel both of the intersymbol interference and the cross polarization interference in the output signal.

In conjunction with FIG. 3, the decision circuit 45 judges the second equalized signal in accordance with a plurality of threshold levels to produce the judged signal when the second equalized signal has a multilevel.

Figure 4:
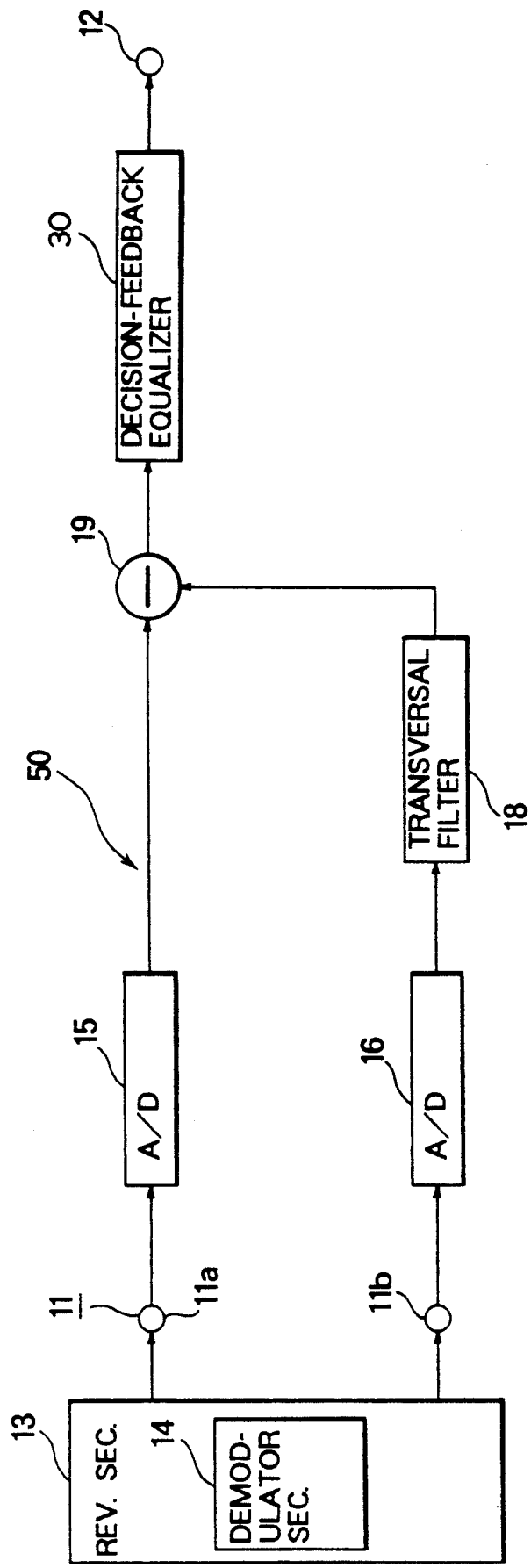
FIG. 4 is a block diagram of an automatic equalizer according to a second embodiment of this invention.

Referring to FIG. 4, description will be made as regards an automatic equalizer according to a second embodiment of this invention. The illustrated automatic equalizer is different in structure from the automatic equalizer 20 illustrated with reference to FIG. 2 and is therefore designated afresh by a reference numeral 50. The automatic equalizer 50 comprises similar parts which are designated by like reference numerals and are operable with likewise named signals.

As described in conjunction with FIG. 2, the A/D converters 15 and 16 produces the first and the second digital signals, respectively. The second digital data signal is filtered into the filtered signal by the transversal filter 18.

The filtered signal is supplied together with the first digital data signal to the subtracter 19. In order to cancel the cross polarization interference in the first digital data signal, the subtracter 19 subtracts the filtered signal from the first digital data signal to produce a difference signal which will be called the intermediate signal hereinafter. The intermediate signal is sent from the subtracter 19 to the decision-feedback equalizer 30 to be equalized into the second equalized signal as the output signal which has no intersymbol interference.

Figure 5:
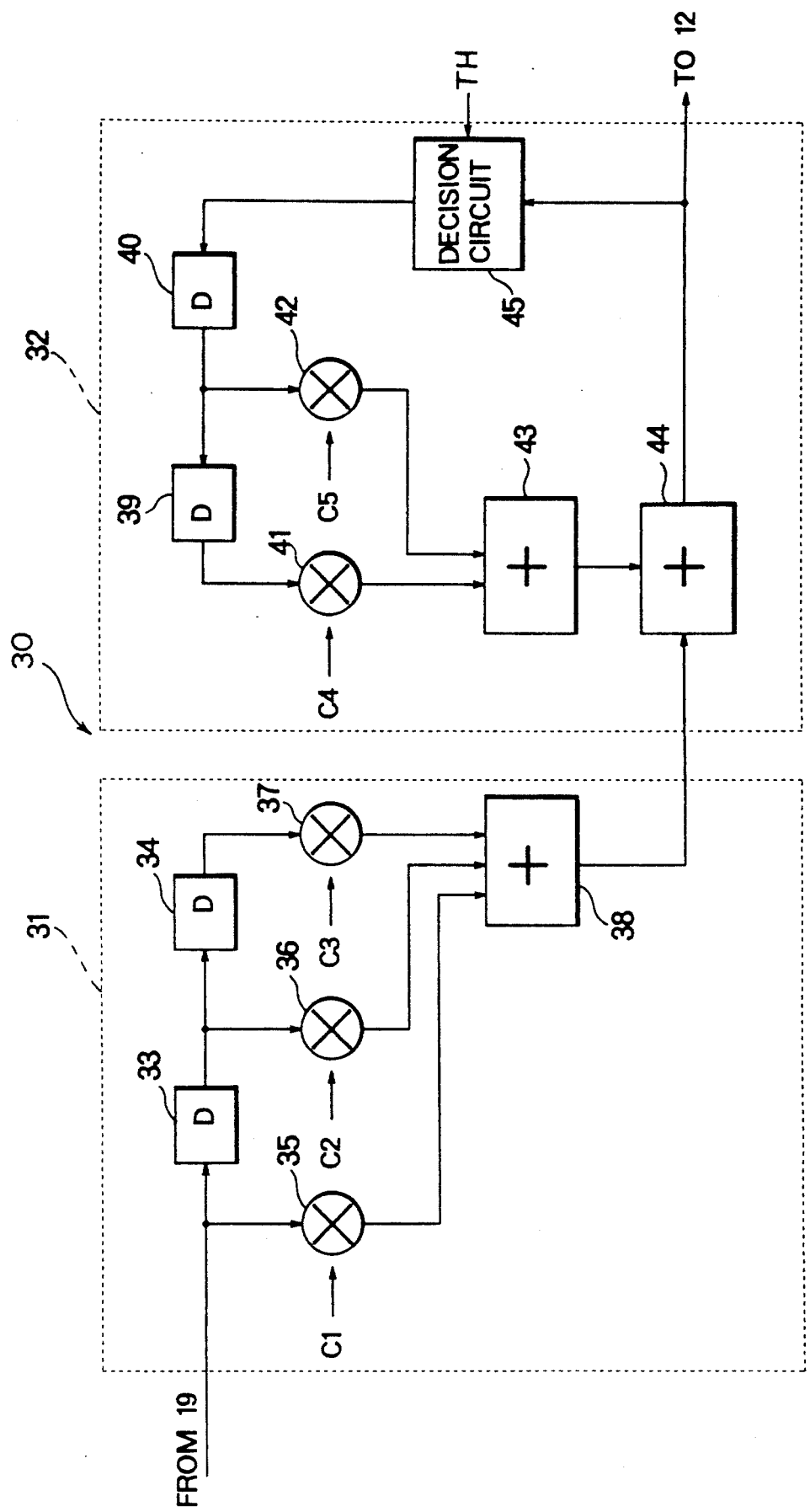
FIG. 5 is a block diagram of a decision-feedback equalizer illustrated in FIG. 4.

Referring to FIG. 5, the first equalized signal is directly supplied from the first equalizer section 31 to the second equalizer section 32. Inasmuch as description is already made as regards the first and the second equalizer sections 31 and 32 with reference to FIG. 3, the first and the second equalizer sections 31 and 32 will not be described any longer in the illustrated example.

While this invention has thus far been described in conjunction with a preferred embodiment thereof, it will readily be possible for those skilled in the art to put this invention into practice in various other manners. In conjunction with FIG. 2, the input terminal 11 may be directly connected to the decision-feedback equalizer 20 and the transversal filter 18 without the A/D converters 15 and 16, respectively, when the demodulated signal is given as an intermediate-frequency (IF) signal.

Similarly, the input terminal 11 may be directly connected to the subtracter 19 and the transversal filter 18 without the A/D converters 15 and 16, respectively, in conjunction with FIG. 4.

What is claimed is:

1. An automatic equalizer for use in combination with a receiver section comprising a demodulator which demodulates first and second received signals into first and second demodulated signals, respectively, said automatic equalizer being for equalizing said first demodulated signal into an equalized signal to produce said equalized signal as an output signal, said first and said second received signals being transmitted through a co-channel to said receiver section, said first received signal having a first polarization which carries a first data signal, said second received signal having a second polarization which carries a second data signal, and said first and said second demodulated signals having said first and said second data signals, respectively, said automatic equalizer comprising:
   first equalizer means for equalizing said first data signal into a first equalized signal;
   filter means for filtering said second data signal into a filtered signal;
   producing means for producing an intermediate signal, dependent upon said first equalized signal and said filtered signal, to cancel cross-polarization interference; and
   second equalizer means for equalizing said intermediate signal into a second equalized signal to cancel intersymbol interference and to produce a second equalized signal as said output signal.

2. An automatic equalizer as claimed in claim 1, wherein said filter means is a transversal filter.

3. An automatic equalizer as claimed in claim 1, wherein said producing means comprises a subtracter which subtracts said filtered signal from said first equalized signal to produce said intermediate signal.

4. An automatic equalizer as claimed in claim 3, wherein said second equalizer means comprises:
   adder means for adding an adder input signal to said intermediate signal to produce a sum signal as said second equalized signal which is a binary signal specified by a binary level;
   judging means for judging whether or not a binary level of said sum signal exceeds a predetermined threshold level to decide a judged binary level for said sum signal and to thereby produce a judged signal specifying said judged binary level; and
   means for equalizing said judged signal into a third equalized signal to supply said third equalized signal as said adder input signal to said adder means.

5. An automatic equalizer as claimed in claim 3, wherein said second equalizer means comprises:
   adder means for adding said intermediate signal to an adder input signal to produce a sum signal as said second equalized signal which is a multilevel signal having a plurality of levels greater than two;

judging means for judging which one of said levels said multilevel signal has as a judged level to produce a judged signal representative of said judged level; and means for equalizing said judged signal into a third equalized signal to supply said third equalized signal as said adder input signal to said adder means.

* * * * *